US012789135B2

(12) United States Patent
Dums et al.

(10) Patent No.: US 12,789,135 B2
(45) Date of Patent: Nov. 10, 2026

(54) GAS SCRUBBING APPARATUS FOR ABSORBING CARBON DIOXIDE FROM THE AMBIENT AIR

(71) Applicant: Dr. Ing. h.c. F. Porsche Aktiengesellschaft, Stuttgart (DE)

(72) Inventors: Karl Dums, Renningen (DE); Dietmar Schwarzenthal, Ditzingen (DE); Marcos Remedios Marques, Wurmberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 356 days.

(21) Appl. No.: 18/482,970

(22) Filed: Oct. 9, 2023

(65) Prior Publication Data

US 2024/0165552 A1 May 23, 2024

(30) Foreign Application Priority Data

Nov. 21, 2022 (DE) ..................... 10 2022 130 688.7

(51) Int. Cl.
*B01D 53/14* (2006.01)
*B01D 53/02* (2006.01)
(Continued)

(52) U.S. Cl.
CPC ......... *B01D 53/1475* (2013.01); *B01D 53/02* (2013.01); *B01D 53/185* (2013.01);
(Continued)

(58) Field of Classification Search
CPC .. B01D 53/1475; B01D 53/02; B01D 53/185; B01D 53/261; B01D 53/28;
(Continued)

(56) References Cited

U.S. PATENT DOCUMENTS 3,768,981 A * 10/1973 Alliger ............... B01D 53/9454 261/92
4,259,301 A * 3/1981 Say .................... B01D 53/1456 502/29
(Continued)

FOREIGN PATENT DOCUMENTS

CN 1112852 A * 12/1995 ......... B01D 53/1475
CN 105865145 A * 8/2016 ................ C10L 3/10
DE 102008015081 A1 10/2009

OTHER PUBLICATIONS

German Examination Report issued Mar. 2, 2026, by the German Patent and Trademark Office in corresponding German Patent Application No. 10 2022 130 688.7 with an English translation. (6 pages).

*Primary Examiner* — Jennifer Dieterle
*Assistant Examiner* — Miriam N Ezeluomba
(74) *Attorney, Agent, or Firm* — Buchanan Ingersoll & Rooney PC

(57) ABSTRACT

Gas scrubbing apparatus for absorbing carbon dioxide from the ambient air. The apparatus includes a scrubbing chamber with a raw gas inlet for bringing in the ambient air stream containing carbon dioxide to be scrubbed, an absorbent inlet for bringing in an absorbent, a clean gas outlet for discharging the scrubbed ambient air stream and an absorbate outlet for discharging an absorbate that has absorbed the carbon dioxide. The clean gas outlet is fluidically connected to a drying apparatus having at least one drying unit, which is configured to absorb the water contained in the clean gas in a drying process and remove it in a regeneration process. The drying apparatus is fluidically connected to the absorbent inlet and/or to the raw gas inlet such that the water removed in the regeneration process is brought into the scrubbing chamber via the raw gas inlet and/or the absorbent inlet.

14 Claims, 2 Drawing Sheets

(51) Int. Cl.

| | |
|---|---|
| ***B01D 53/18*** | (2006.01) |
| ***B01D 53/26*** | (2006.01) |
| ***B01D 53/28*** | (2006.01) |

(52) U.S. Cl.
CPC ........... *B01D 53/261* (2013.01); *B01D 53/28* (2013.01); *B01D 2253/108* (2013.01); *B01D 2257/504* (2013.01); *B01D 2257/80* (2013.01); *B01D 2258/01* (2013.01); *B01D 2258/06* (2013.01); *B01D 2259/402* (2013.01)

(58) Field of Classification Search
CPC ........ B01D 2253/108; B01D 2257/504; B01D 2257/80; B01D 2258/01; B01D 2258/06; B01D 2259/402; B01D 53/1406; B01D 53/18; Y02C 20/40
USPC ........................................................... 96/121
See application file for complete search history.

(56) References Cited

U.S. PATENT DOCUMENTS

| | | | | |
|---|---|---|---|---|
| 2010/0107872 A1* | 5/2010 | Bethell | .................. | C12M 47/18<br>95/92 |
| 2010/0229725 A1* | 9/2010 | Farsad | .................. | B01D 53/64<br>261/36.1 |
| 2017/0190574 A1* | 7/2017 | Ercan | ................. | B01D 53/8615 |

* cited by examiner

GAS SCRUBBING APPARATUS FOR ABSORBING CARBON DIOXIDE FROM THE AMBIENT AIR

CROSS-REFERENCE TO RELATED APPLICATION

This application claims priority to German Patent Application No. 10 2022 130 688.7, filed Nov. 21, 2022, the content of such application being incorporated by reference herein in its entirety.

FIELD OF THE INVENTION

A gas scrubbing apparatus for absorbing carbon dioxide from the ambient air is considered. The gas scrubbing apparatus comprises a gas scrubber, which comprises a scrubbing chamber with a raw gas inlet for bringing in the ambient air stream containing carbon dioxide to be scrubbed, an absorbent inlet for bringing in an absorbent, a clean gas outlet for discharging the scrubbed ambient air stream and an absorbate outlet for discharging an absorbate that has absorbed the carbon dioxide.

SUMMARY OF THE INVENTION

Such gas scrubbing apparatuses are known in particular in the aftertreatment of exhaust gases from industrial plants and serve to reduce environmentally harmful components of the exhaust gas released into the outside environment. The exhaust gas is brought into a scrubbing chamber of a gas scrubber via a raw gas inlet. In the scrubbing chamber, the introduced raw gas is brought into contact with a liquid absorbent, wherein the absorbent is brought into the scrubbing chamber through an absorbent inlet and serves to bind the carbon dioxide present in the exhaust gas. The absorbate, i.e. the scrubbing liquid with the carbon dioxide bound to it, is discharged from the scrubbing chamber via an absorbate outlet. Lastly, in a further step, the carbon dioxide is separated from the absorbate, so that an absorbent, i.e. the scrubbing liquid without the dissolved carbon dioxide, and carbon dioxide in an unbound state are again present. By removing the carbon dioxide from the exhaust gas the pollutants emitted into the environment can be reduced.

Another known use of the gas scrubbing apparatus is obtaining carbon dioxide from the ambient air. The carbon dioxide extracted from the ambient air can, for example, be used to produce synthetic fuels, wherein synthetic fuels are produced from power, water and carbon dioxide by a so-called Power-to-X technology, in particular by a Power-to-Liquid process. The synthetic fuels can be used as fuel for an internal combustion engine of a motor vehicle, for example.

Due to the relatively low concentration of carbon dioxide in the ambient air, approximately 400 ppm, a large amount of ambient air has to be passed through the gas scrubber to extract the amount of carbon dioxide needed to produce synthetic fuels from the ambient air. The problem is that the ambient air brought into the gas scrubber has a humidity below 100%, i.e. is not saturated with water, and absorbs the liquid or water of the liquid or aqueous absorbent. After the gas scrubbing process, the liquid or water is discharged from the gas scrubber via the clean gas. Removing the liquid from the absorbent increases the concentration of the aqueous absorbent. To compensate this effect, water would have to be added to the absorbent and/or the ambient air, wherein due to the enormous amount of ambient air passed through the gas scrubber because of the low concentration of carbon dioxide in ambient air, the amount of water required to compensate the water discharged from the absorbent is relatively high.

Described herein is a gas scrubbing apparatus for absorbing carbon dioxide from ambient air with a reduced water requirement.

According to aspects of the invention, the gas scrubbing apparatus comprises a drying apparatus that is fluidically connected to the clean gas outlet, wherein the clean gas flowing out of the clean gas outlet, i.e. the gas that no longer contains carbon dioxide, flows through the drying apparatus before flowing out into the outside environment. The drying apparatus comprises at least one drying unit for drying the clean gas, i.e. for removing the water from the clean gas. The drying unit is designed such that it can bind the water contained in the clean gas in a drying process and can again release the absorbed water in a regeneration process. The water carried out of the gas scrubber by the clean gas and separated from the absorbent can be removed from the clean gas by the drying process. In the subsequent regeneration process, the water bound in the drying unit can be released again in order to feed it again to the gas scrubber. For this purpose, the drying apparatus is fluidically connected to the absorbent inlet and/or to the raw gas inlet.

The water requirement in operation of the gas scrubbing apparatus can thus be reduced by recirculating the water discharged from the gas scrubber by the clean gas. In this way, carbon dioxide can be filtered out of the ambient air, without an enormous water requirement being necessary for this.

The drying apparatus preferably comprises multiple drying units and a valve element, wherein the valve element is arranged in front of the drying units in the flow direction of the clean gas, such that a stream of clean gas is selectively directed to a first drying unit or to a second drying unit. The removal of water from the clean gas can thus be continuous, wherein the valve element is switched between the two switch positions such that one of the two drying units is in the drying process and, at the same time, the other drying unit is in the regeneration process. In other words, the clean gas is fed to a first drying unit until it is saturated with water. The valve element then switches over and the clean gas is fed to the second drying unit. Meanwhile the regeneration process is carried out in the first drying unit and the first drying unit removes the absorbed water again. As soon as the second drying unit is saturated, the valve element switches back to the first drying unit and the second drying unit can regenerate.

In a preferred configuration, the at least one drying unit comprises a drying chamber and a drying medium arranged in the drying chamber. In a particularly preferred configuration, the drying medium is a silicate gel or a zeolite material. The drying medium absorbs the water dissolved in the clean gas. Heating the drying medium releases the water from the drying medium in the form of water vapor. The released water vapor then cools and condenses. The condensed water can then be fed into the scrubbing chamber via the absorbent inlet or the raw gas inlet. The water can thus be removed from the clean gas in a simple and cost-effective manner and reused.

The gas scrubber preferably comprises a raw gas distribution element which is arranged in the scrubbing chamber. The raw gas distribution element is arranged in the region of the raw gas inlet and serves to distribute the raw gas in the scrubbing chamber and prevent gas jet formation. The scrubbing process, i.e. the filtering of carbon dioxide out of the raw gas by means of the absorbent, can thus be improved.

In a preferred configuration, the gas scrubber comprises a liquid separator which is arranged in front of the drying apparatus in the flow direction of the clean gas, in particular inside the scrubbing chamber and in flow direction in front of the clean gas outlet. The liquid separator is in particular a droplet separator, by means of which an entrainment of the absorbent brought into the scrubbing chamber and water droplets pulled into the clean gas outlet and thus into the outside environment can be prevented. The entrainment of water droplets and the absorbent can thus be reduced or prevented in a simple and cost-effective manner.

The gas scrubber preferably comprises an absorbent distribution device which is arranged in the scrubbing chamber. The absorbent distribution device can comprise multiple nozzles, preferably arranged on multiple planes, for spraying the absorbent in the scrubbing chamber. This is a spray scrubber. Alternatively, the gas scrubber comprises a plate column with multiple plates at different levels, wherein the plates are provided with holes through which the introduced ambient air can rise to the next plate. The absorbent passes across the plates from a shaft and accumulates on a weir from which it runs down the shaft to the next plate. Therefore, there is intensive contact between the ambient air containing the carbon dioxide and the absorbent on every plate. The gas scrubber can also be designed as a so-called bubble column reactor with a bubbling layer.

This provides a gas scrubbing apparatus for absorbing carbon dioxide from ambient air by means of which a large amount of ambient air can be passed through the gas scrubber with a relatively low water requirement, and as a result a large amount of carbon dioxide can be released from the ambient air.

BRIEF DESCRIPTION OF THE DRAWINGS

Two embodiment examples of the invention are explained in more detail with reference to the drawings.

DETAILED DESCRIPTION OF THE INVENTION

Figure 1:
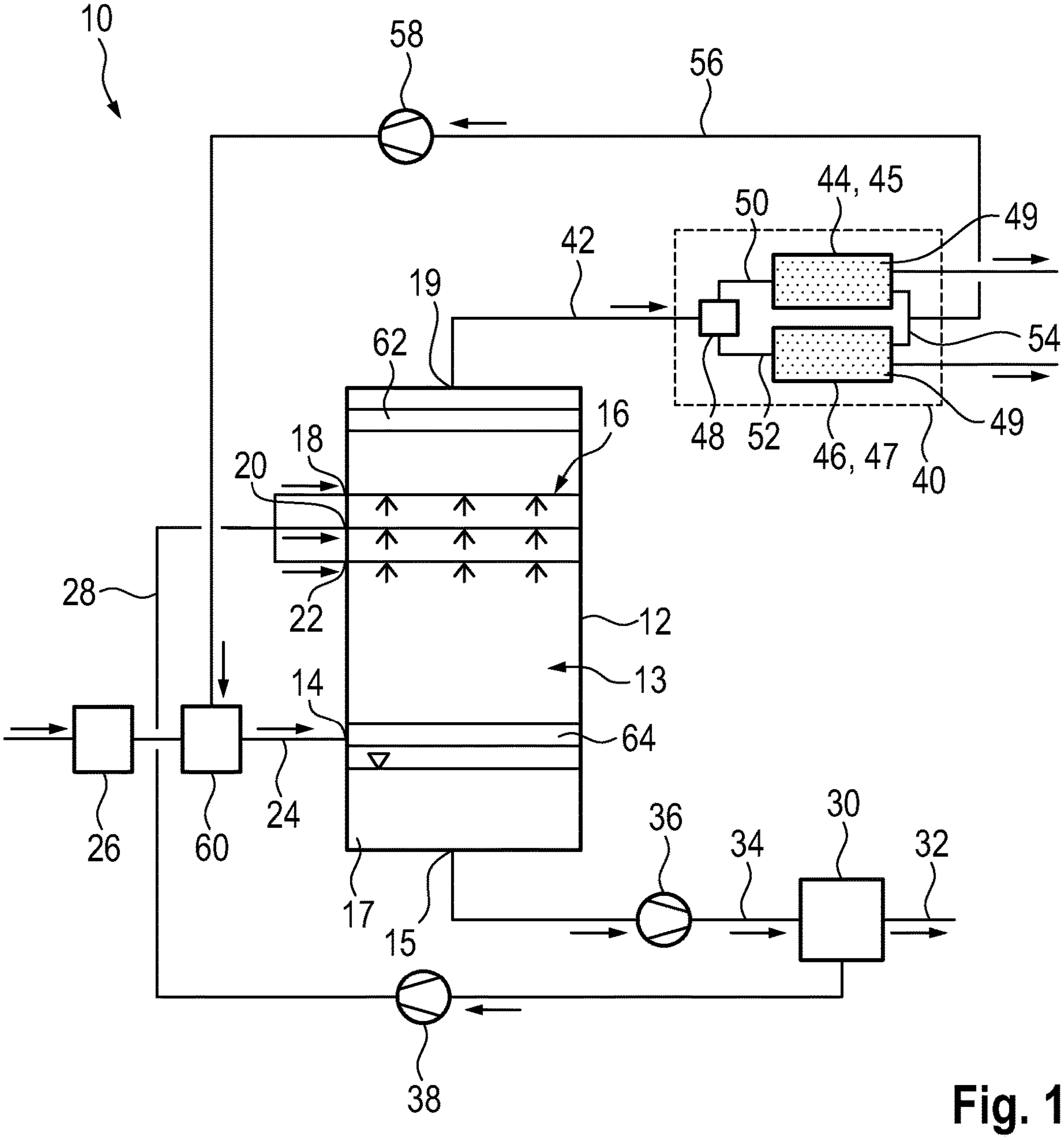
FIG. 1 schematically shows a first embodiment of a gas scrubbing apparatus, and FIG. 2 schematically shows a second embodiment of a gas scrubbing apparatus.

FIG. 1 shows a gas scrubbing apparatus 10 for filtering carbon dioxide out of ambient air. The gas scrubbing apparatus 10 comprises a gas scrubber 12 which delimits a scrubbing chamber 13. The scrubbing chamber 13 comprises a raw gas inlet 14, multiple absorbent inlets 18, 20, 22, an absorbate outlet 15 and a clean gas outlet 19.

The raw gas inlet 14 is connected to an outside environment via a raw gas line 24 and serves to bring ambient air into the scrubbing chamber 13. In front of the raw gas inlet 14 in the flow direction of the raw gas, the raw gas line 24 comprises a filter 26 for filtering dirt and particles out of the raw gas, so that as much as possible only the cleaned, unpolluted ambient air is brought in via the raw gas inlet 14. In the region of the raw gas inlet 24, a raw gas distribution element 64 is arranged in the scrubbing chamber 13, which serves for even distribution of the raw gas brought into the scrubbing chamber 13 over the cross-section of the scrubbing chamber 13.

The absorbent inlets 18, 20, 22 are connected to a carbon dioxide separator 30 via an absorbent line 28. The carbon dioxide separator 30 is also fluidically connected to the absorbate outlet 15 via an absorbate line 34. The absorbent inlets 18, 20, 22 are further fluidically connected on the scrubbing chamber side to a distribution device 16, wherein the distribution device 16 has multiple planes with in each case a plurality of nozzles. In operation of the gas scrubbing apparatus 10, the scrubbing agent thus circulates between the gas scrubber 12 and the carbon dioxide separator 30. A pump 36, 38 is respectively arranged on the absorbent line 28 and on the absorbate line 34, wherein the pump 36 serves to convey the absorbate starting from the absorbate outlet 15 to the carbon dioxide separator 30 and the pump 38 serves to convey the absorbent starting from the carbon dioxide separator 30 to the absorbent inlets 18, 20, 22.

The clean gas outlet 19 is fluidically connected to a drying apparatus 40 via a clean gas line 42. A water separator 62 in the form of a droplet separator is arranged in front of the clean gas outlet 19 in the flow direction of the clean gas and thus in front of the drying apparatus 40. The water separator 62 prevents the absorbent and water droplets from being entrained by the clean gas flow and pulled into the clean gas outlet 19 and thus out of the gas scrubber 12.

The drying apparatus 40 comprises two drying units 44, 46, in each case with a drying chamber 45, 47, wherein a drying medium 49 is respectively arranged in the drying chambers 45, 47. The drying medium 49 is in particular a silicate gel. The drying apparatus 40 also comprises a valve element 48, in particular a 3/2-way valve, to which the clean gas line 42, a first drying line 50 leading to the first drying unit 44 and a second drying line 52 leading to the second drying unit 46 connect. In a first switch position, the clean gas flows emerging from the clean gas line 42 into the first drying line 50 and thus into the first drying unit 44. In a second switch position of the valve element 48, the clean gas flows emerging from the clean gas line 42 via the second drying line 52 into the second drying unit 46.

The drying apparatus 40 is fluidically connected to a humidification device 60 via a water line 56, wherein the humidification device 60 is arranged on the raw gas line. A pump 58 is arranged on the water line 56.

In the operation of the scrubbing apparatus 10, the ambient air cleaned by the filter 26 is brought into the scrubbing chamber 13 via the raw gas line 24 and the raw gas inlet 14 and distributed as evenly as possible over the cross-section of the scrubbing chamber 13 by the raw gas distribution element 64. At the same time, an absorbent, i.e. an unloaded scrubbing liquid, is brought into the scrubbing chamber 13 via the absorbent inlets 18, 20, 22 and distributed over the cross-section of the scrubbing chamber 13 via the absorbent distribution device 16 arranged above the raw gas inlet 14. In the subsequent scrubbing process, the absorbent removes the carbon dioxide from the raw gas, i.e. the ambient air, and binds it. The thus produced absorbate, i.e. the loaded scrubbing liquid, collects in a sump 17. The sump 17 is fluidically connected to the carbon dioxide separator 30 via the absorbate outlet and the absorbate line 34, so that the absorbate flows from the sump 17 to the carbon dioxide separator 30. In the carbon dioxide separator 30, the carbon dioxide is removed from the absorbate and discharged via a line 32 for further use. The absorbent is pumped back to the absorbent inlets 18, 20, 22 via the absorbent line 28 and into the scrubbing chamber 13. The clean gas produced during the scrubbing process, i.e. the ambient air that has flowed in through the raw gas inlet 14 without the released carbon dioxide, rises toward the clean gas outlet 19, wherein the clean gas passes through the water separator 62 in such a way that the entrained absorbent and water droplets are removed. Starting from the clean gas outlet 19, the clean gas flows via the clean gas line 42 to the drying apparatus 40. By the corresponding setting of the valve element 48 into the first switch position, the clean gas flows within the drying apparatus 40 to the first drying unit 44, wherein the clean gas flows through the drying chamber 45 in a drying process and is dried via the absorption of the water or the moisture contained in the clean gas by the drying medium 49. As soon as the drying medium 49 is saturated with water, the valve element 48 is moved to the second switch position, so that the clean gas flows to the second drying unit 46 and the clean gas is dried by the drying medium 49 of the second drying unit. At the same time, the water absorbed by the drying medium 49 is released from the drying medium 49 in a regeneration process by a heating of the drying medium 49 and subsequent cooling. As soon as the drying medium 49 of the second drying unit 46 is saturated with water, the valve element 48 is moved back to the first switch position, so that the clean gas is returned to the regenerated, first drying unit 44 and can regenerate the second drying unit 46. Switching between the two drying units 44, 46 takes place many times during the operation of the scrubbing process.

The dried air is discharged from the drying apparatus 10 into the outside environment. The water released from the clean gas is pumped via a merging line 54 and the water line 56 to a raw gas humidifier 60. The raw gas humidifier 60 is arranged in front of the raw gas inlet 14 in the flow direction of the raw gas and serves to humidify the raw gas before it enters the scrubbing chamber 13 and in particular before the raw gas comes into contact with the absorbent. The raw gas humidifier 60 is in particular designed such so much water is supplied to the raw gas that the raw gas is saturated with water, i.e. has a humidity of 100%. Removal of water from the absorbent can thus be prevented.

Figure 2:
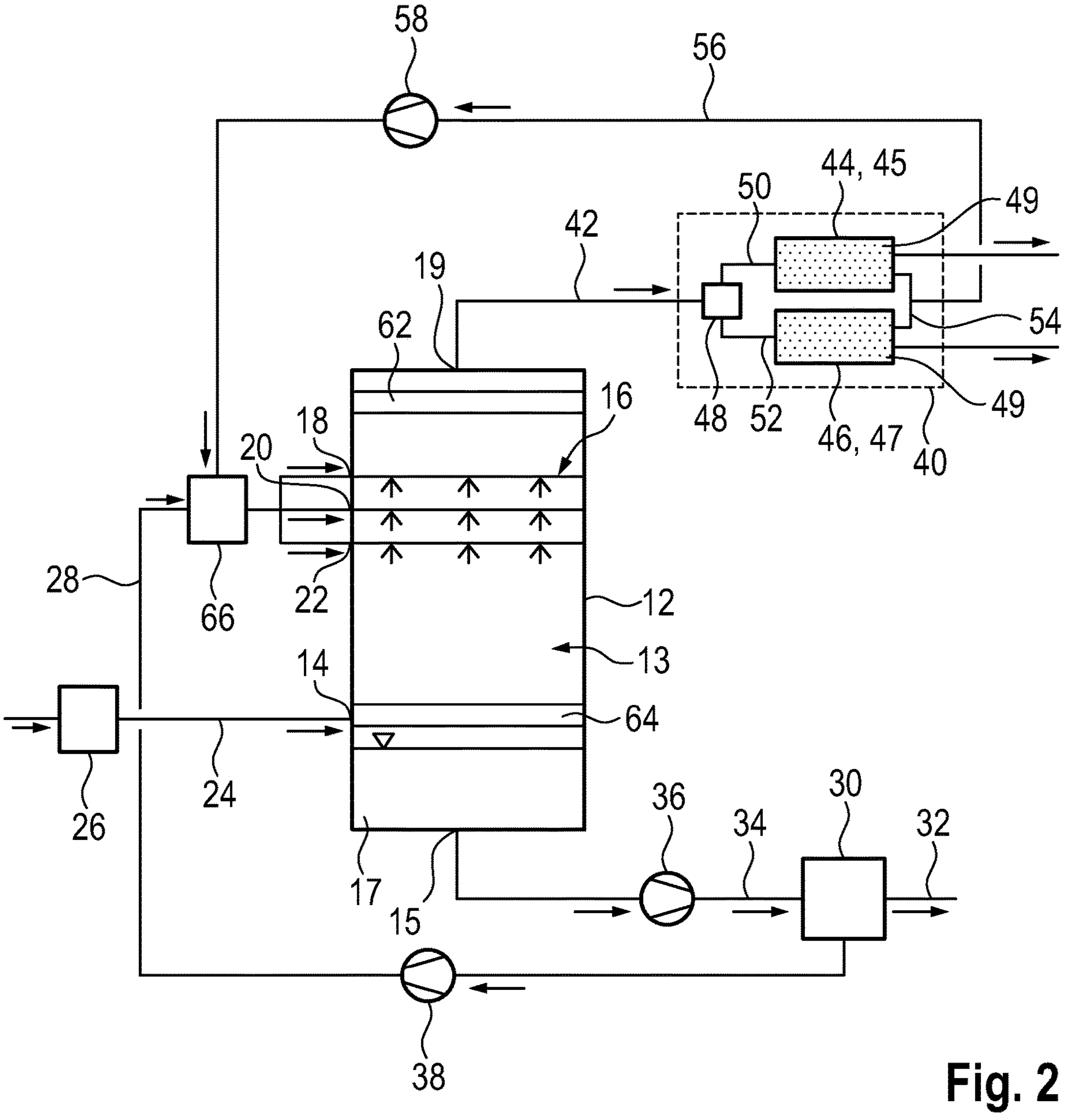

FIG. 2 shows a second, turned away embodiment of the gas scrubbing apparatus 10. The deciding difference to the first embodiment of FIG. 1 is that the drying apparatus 40 is not fluidically connected to the raw gas line 24 as in the first embodiment of FIG. 1, but is fluidically connected to a water supply element 66 arranged on the absorbent line 28. As a result, the water removed from the clean gas is supplied directly to the absorbent and the increased concentration of the absorbent is compensated. The other components of the scrubbing apparatus 10 are designed as in the first embodiment of FIG. 1.

This provides a gas scrubbing apparatus 10 for absorbing carbon dioxide from ambient air, by means of which a large amount of ambient air can be passed through the gas scrubber 12 with a relatively low water requirement, and as a result a large amount of carbon dioxide can be released from the ambient air.

What is claimed is:

1. A gas scrubbing apparatus for absorbing carbon dioxide from ambient air, said gas scrubbing apparatus comprising:

a gas scrubber having a scrubbing chamber, a raw gas inlet that is configured to receive an ambient air stream containing carbon dioxide to be scrubbed, an absorbent inlet configured to receive an absorbent, a clean gas outlet configured to discharge the scrubbed ambient air stream, and an absorbate outlet configured to discharge an absorbate that has absorbed the carbon dioxide, a drying apparatus fluidically connected to the clean gas outlet, wherein the drying apparatus comprises at least one drying unit, which is configured to absorb water contained in the clean gas in a drying process and remove the water in a regeneration process, and a water supply element that is fluidly connected between the absorbent inlet and the drying apparatus for delivering the water removed in the regeneration process by the drying apparatus to the absorbent inlet, wherein the drying apparatus is fluidically connected to the absorbent inlet such that the water removed in the regeneration process is received in the scrubbing chamber via the absorbent inlet.

2. The gas scrubbing apparatus according to claim 1, wherein the drying apparatus comprises multiple drying units and a valve element, wherein the valve element is arranged in front of the drying units in a flow direction of the clean gas, such that a stream of clean gas is selectively directed to either a first drying unit or a second drying unit of the multiple drying units.

3. The gas scrubbing apparatus according to claim 1, wherein the at least one drying unit comprises a drying chamber and a drying medium arranged in the drying chamber for absorbing the water contained in the clean gas.

4. The gas scrubbing apparatus according to claim 3, wherein the drying medium is a silicate gel or a zeolite material.

5. The gas scrubbing apparatus according to claim 1, wherein the gas scrubber further comprises a raw gas distribution element which is arranged in the scrubbing chamber.

6. The gas scrubbing apparatus according to claim 1, wherein the gas scrubber further comprises a water separator arranged upstream of the drying apparatus in a flow direction of the clean gas.

7. The gas scrubbing apparatus according to claim 6, wherein the water separator is a droplet separator.

8. The gas scrubbing apparatus according to claim 1, wherein the gas scrubber further comprises an absorbent distribution device which is arranged in the scrubbing chamber.

9. An exhaust gas system comprising the gas scrubbing apparatus according to claim 1.

10. A vehicle comprising the exhaust gas system of claim 9.

11. The gas scrubbing apparatus according to claim 1 further comprising one or more conduits fluidly connecting the absorbate outlet to the absorbent inlet and a pump that circulates absorbate from the absorbate outlet to the absorbent inlet via the one or more conduits.

12. The gas scrubbing apparatus according to claim 11, further comprising a carbon dioxide separator that is fluidly connected to said one or more conduits for converting the absorbate to the absorbent.

13. The gas scrubbing apparatus according to claim 1, wherein, on the scrubbing chamber, the absorbent inlet is defined at an elevation above the raw gas inlet.

14. The gas scrubbing apparatus according to claim 6, further comprising an absorbent distribution device disposed within the gas scrubber, and wherein the water separator is arranged upstream of the drying apparatus and downstream of the absorbent distribution device.

* * * * *